US008643339B2

(12) United States Patent
Iwamura et al.

(10) Patent No.: US 8,643,339 B2
(45) Date of Patent: Feb. 4, 2014

(54) BATTERY PACK INCLUDING A STATUS DETECTION UNIT TO DETECT AN ABNORMAL STATUS AND A NOTIFICATION UNIT TO NOTIFY A USER OF AN AVAILABILITY TO RESTART A DISCHARGING OPERATION

(75) Inventors: Norihiro Iwamura, Hikone (JP); Motoharu Muto, Hikone (JP); Masaki Ikeda, Hikone (JP); Naoki Shimizu, Hikone (JP); Atsumasa Kubota, Hikone (JP); Masaaki Okada, Hikone (JP); Tatsuya Miwa, Hikone (JP)

(73) Assignee: Panasonic Corporation, Osaka (JP)

( * ) Notice: Subject to any disclaimer, the term of this patent is extended or adjusted under 35 U.S.C. 154(b) by 980 days.

(21) Appl. No.: 12/382,594

(22) Filed: Mar. 19, 2009

(65) Prior Publication Data

US 2009/0243545 A1   Oct. 1, 2009

(30) Foreign Application Priority Data

Mar. 26, 2008   (JP) .................................. 2008-082123

(51) Int. Cl.
*H02J 7/00* (2006.01)
(52) U.S. Cl.
USPC ..................... 320/136; 320/150; 320/DIG. 18
(58) Field of Classification Search
USPC ............ 320/136, 134, 150, DIG. 18, DIG. 21
See application file for complete search history.

(56) References Cited

U.S. PATENT DOCUMENTS 4,670,703 A * 6/1987 Williams ...................... 320/125
5,432,429 A * 7/1995 Armstrong et al. ........... 320/136
5,990,663 A * 11/1999 Mukainakano ............... 320/134
6,072,299 A * 6/2000 Kurle et al. ................... 320/112
6,160,381 A * 12/2000 Peterzell ....................... 320/134
6,194,869 B1 * 2/2001 Peterzell ....................... 320/134

(Continued)

FOREIGN PATENT DOCUMENTS

| JP | H03003616 | 1/1991 |
| JP | 10-285810 | 10/1998 |
| JP | 2000-331719 | 11/2000 |
| JP | 2001095158 | 4/2001 |
| JP | 2003-164066 | 6/2003 |
| WO | WO 02/073770 | 9/2002 |
| WO | WO 2006064726 A1 * | 6/2006 |

OTHER PUBLICATIONS

English summary of the Japanese Office Action dated Dec. 15, 2009.

(Continued)

*Primary Examiner* — Samuel Berhanu
*Assistant Examiner* — Manuel Hernandez
(74) *Attorney, Agent, or Firm* — Bacon & Thomas, PLLC

(57) ABSTRACT

A battery pack includes a status detection unit for detecting a status of a battery; a switch unit for interrupting a discharging path of the battery; a notification unit for notifying a user of the status of the battery; an operation unit operable by the user; and control unit for opening and closing the switch unit. The control unit is configured to have the switch unit interrupt the discharging path of the battery when the status of the battery detected by the status detection unit is abnormal. Further, the control unit is configured to have the notification unit notify the user of the availability to restart a discharging operation and close the switch unit in response to an operation signal inputted from the operation unit to make the battery pack dischargeable when the status of the battery detected by the status detection unit is recovered from the abnormal status.

5 Claims, 5 Drawing Sheets

(56) References Cited

U.S. PATENT DOCUMENTS

| | | | |
|---|---|---|---|
| 6,313,751 B1* | 11/2001 | Whitmire et al. | 340/636.1 |
| 6,340,880 B1* | 1/2002 | Higashijima et al. | 320/162 |
| 6,388,426 B1 | 5/2002 | Yokoo et al. | |
| 6,437,540 B2* | 8/2002 | Sonobe | 320/134 |
| 6,538,413 B1* | 3/2003 | Beard et al. | 320/114 |
| 6,744,698 B2 | 6/2004 | Koyama et al. | |
| 7,872,448 B2* | 1/2011 | Taniguchi et al. | 320/131 |
| 2003/0096158 A1 | 5/2003 | Takano et al. | |
| 2005/0134230 A1* | 6/2005 | Sato et al. | 320/136 |
| 2006/0076934 A1* | 4/2006 | Ogata et al. | 320/136 |
| 2007/0131268 A1* | 6/2007 | Taniguichi et al. | 136/205 |
| 2011/0298626 A1* | 12/2011 | Fechalos et al. | 340/664 |

OTHER PUBLICATIONS

The Japanese office action dated Nov. 30, 2010 and English summary thereof.

The Japanese Decision of Rejection in corresponding Japanese application 2008-082123 dated Nov. 1, 2011 and English Summary thereof.

* cited by examiner

BATTERY PACK INCLUDING A STATUS DETECTION UNIT TO DETECT AN ABNORMAL STATUS AND A NOTIFICATION UNIT TO NOTIFY A USER OF AN AVAILABILITY TO RESTART A DISCHARGING OPERATION

FIELD OF THE INVENTION

The present invention relates to a battery pack provided with a secondary battery and, more particularly, to a battery pack including a safety protection circuit incorporated therein.

BACKGROUND OF THE INVENTION

A battery pack containing a secondary battery, particularly a lithium-based secondary battery, includes a safety protection circuit provided within the battery pack. The safety protection circuit is provided with an interrupter unit that interrupts the secondary battery from a discharging circuit or a recharging circuit when an abnormal situation occurs.

In the safety protection circuit that detects over-discharging or temperature rise and interrupts the secondary battery, it is typical that the interrupter unit automatically restores the original state as soon as the abnormal situation is released (see, e.g., Japanese Patent Laid-open Publication No. 10-144285).

In case the battery pack is used as a power source of an electric power tool, however, there occurs a problem if the restoration proceeds automatically regardless of the user's intention. In other words, if the restoration occurs in a state that the switch of the electric power tool is turned on, the electric power tool starts its operation at that moment. This may sometimes give rise to a very dangerous situation.

SUMMARY OF THE INVENTION

In view of the above, the present invention provides a battery pack capable of restarting a discharging operation without incurring danger.

In accordance with an aspect of the present invention, there is provided a battery pack including: a status detection unit for detecting a status of a battery; a switch unit for interrupting a discharging path of the battery; a notification unit for notifying a user of the status of the battery; an operation unit operable by the user; and control unit for opening and closing the switch unit, the control unit being configured to have the switch unit interrupt the discharging path of the battery when the status of the battery detected by the status detection unit is abnormal, the control unit being configured to have the notification unit notify the user of the availability to restart a discharging operation and close the switch unit in response to an operation signal inputted from the operation unit to make the battery pack dischargeable when the status of the battery detected by the status detection unit is recovered from the abnormal status.

Preferably, the status detection unit includes a voltage detection unit for detecting the sum total voltage of the battery or the cell-by-cell voltage of the battery, and wherein the control unit interrupts the discharging path when the voltage of the battery continues to be equal to or smaller than a first predetermined value for a first specified time period and determines the discharging operation to be restartable when the voltage of the battery is increased to a second predetermined voltage within a second specified time period. Further, the status detection unit may include a temperature detection unit for detecting the temperature of the battery, the control unit may interrupt the discharging path and has the notification unit notify the user of a temperature rise when the temperature of the battery detected is equal to or higher than a first predetermined temperature, and the control unit may determine the discharging operation to be restartable when the temperature of the battery detected is decreased to a second predetermined temperature or less.

Furthermore, the control unit may include an input unit for monitoring the connection of the battery pack to a recharger, and the control unit may receive a signal indicative of the connection of the battery pack to the recharger from the input unit and closes the switch unit to make the battery pack rechargeable when the discharging operation is determined to be restartable.

With the present invention, the switch unit interrupting the discharging path is not automatically restored even if the battery is restored to a dischargeable state. The discharging operation is restarted in response to an operation signal inputted from the operation unit. In other words, the discharging operation is not restarted without the user's intention to do so. Therefore, safety is secured even when the present battery pack is used as a power source of an electric power tool.

The task of monitoring the voltage of cells of the battery is influenced by the voltage resistance value attributable to the internal resistance of the cells. Therefore, it is sometimes the case that the voltage detected under a large current condition remains low despite the residual cell capacity. With the present invention, it is possible to effectively use the residual cell capacity. This is because the status detection unit includes a voltage detection unit for detecting the sum total voltage of the battery or the cell-by-cell voltage of the battery and because the control unit interrupts the discharging path when the voltage of the battery continues to be equal to or smaller than a first predetermined value for a first specified time period and determines the discharging operation to be restartable when the voltage of the battery is increased to a second predetermined voltage within a second specified time period.

Further, it is possible to interrupt the discharging path when the battery pack is at an elevated temperature and to safely restart the discharging operation when the temperature of the battery pack becomes low. This is because the status detection unit includes the temperature detection unit for detecting the temperature of the battery, because the control unit interrupts the discharging path and has the notification unit notify the user of a temperature rise when the temperature of the battery detected is equal to or higher than the first predetermined temperature, and because the control unit determines the discharging operation to be restartable when the temperature of the battery detected is decreased to the second predetermined temperature or less.

In addition, it is possible to start the discharging operation without having to operate the operation unit. This is because the control unit includes the input unit for monitoring the connection of the battery pack to a recharger and because the control unit receives a signal indicative of the connection of the battery pack to the recharger from the input unit and closes the switch unit to make the battery pack rechargeable when the discharging operation is determined to be restartable.

BRIEF DESCRIPTION OF THE DRAWINGS

The objects and features of the present invention will become apparent from the following description of preferred embodiments, given in conjunction with the accompanying drawings, in which.

DETAILED DESCRIPTION OF THE PREFERRED EMBODIMENTS

Figure 1:
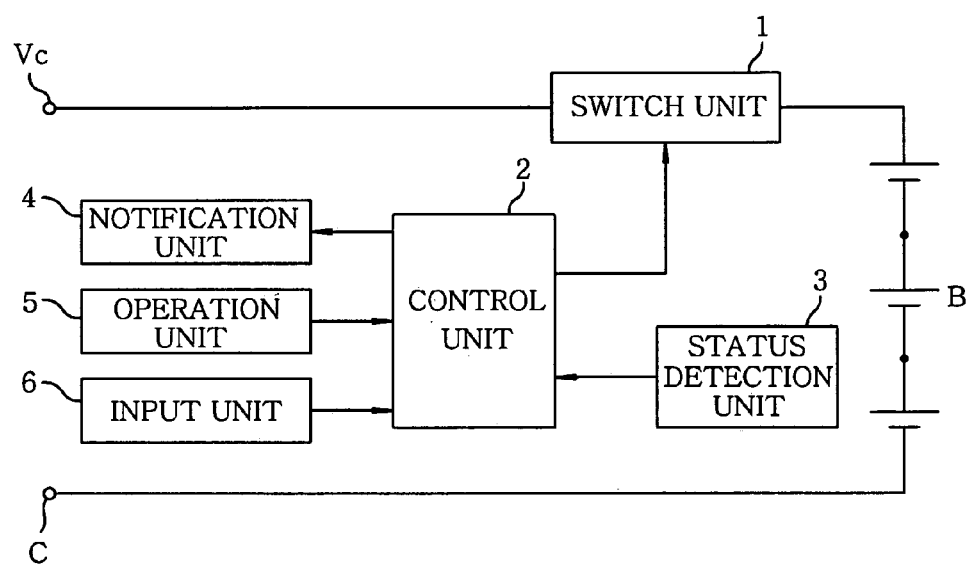
FIG. 1 is a block circuit diagram showing a battery pack in accordance with an embodiment of the present invention.

Hereinafter, an embodiment of the present invention will be described with reference to the accompanying drawings which form a part hereof. FIG. 1 is a block circuit diagram showing a battery pack in accordance with the embodiment of the present invention. Reference symbol "B" designates a secondary battery formed of a plurality of serially connected battery cells. Reference symbol "C" designates a grounded common terminal. Reference symbol "Vc" designates a charging/discharging terminal. A switch unit 1 is provided between the secondary battery B and the charging/discharging terminal Vc. The switch unit 1 is a switchable interrupter unit and includes switching elements that turn on or off in response to control signals supplied from a control unit 2.

Connected to the control unit 2 are a status detection unit 3 for detecting the status of the secondary battery B, a notification unit 4 for notifying occurrence of an abnormal situation, an operation unit 5 configured to be operated by a user and an input unit 6 that receives a signal from a recharger when the battery pack is connected thereto.

During the battery pack is connected to an electric power tool, the control unit 2 receives a signal from the status detection unit 3 and determines the necessity of protection based on the signal. When it is determined that the necessity of protection exists, the control unit 2 opens the switch unit 1 to thereby stop the discharging operation and controls the notification unit 4 to notify the user that the discharging operation has been interrupted as a result of detection of an abnormal situation.

If the control unit 2 determines, based on the signal fed from the status detection unit 3, that the secondary battery B has been recovered from the abnormal situation and is ready to restart the discharging operation, the control unit 2 allows the notification unit 4 to notify the user of the availability to restart the discharging operation. If the user operates the operation unit 5 upon receiving this notice, the control unit 2 turns on the switch unit 1 at that time to bring the battery pack into a dischargeable state. When the battery pack is connected to a recharger while the battery pack is in the dischargeable state, a signal (e.g., recharging voltage) is inputted from the recharger to the control unit 2 through the input unit 6. Responsive to this signal, the control unit 2 turns on the switch unit 1 to bring the battery pack into a rechargeable state.

Figure 2:
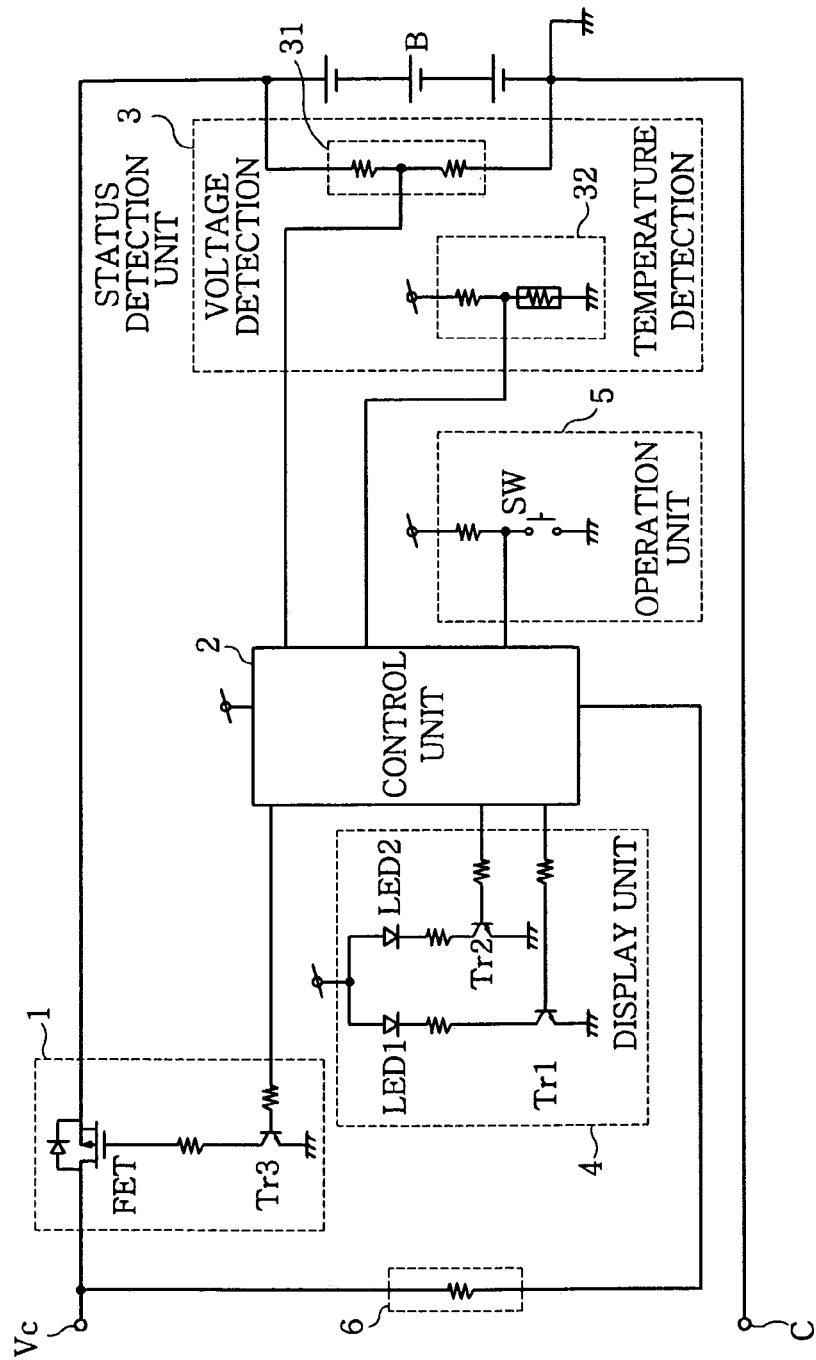
FIG. 2 is a circuit diagram showing the battery pack in more detail.

FIG. 2 shows one example of a specific circuit of the battery pack. A P-channel switching FET and a transistor Tr3 are used as the switch unit 1. The status detection unit 3 includes a voltage detection unit 31 formed of voltage dividing resistors and a temperature detection unit 32 formed of a thermistor. The notification unit 4 includes two kinds of light-emitting diodes LED1 and LED2 that emit light of different colors. The input unit 6 is configured to monitor the voltage of the charging/discharging terminal Vc.

Figure 3A:
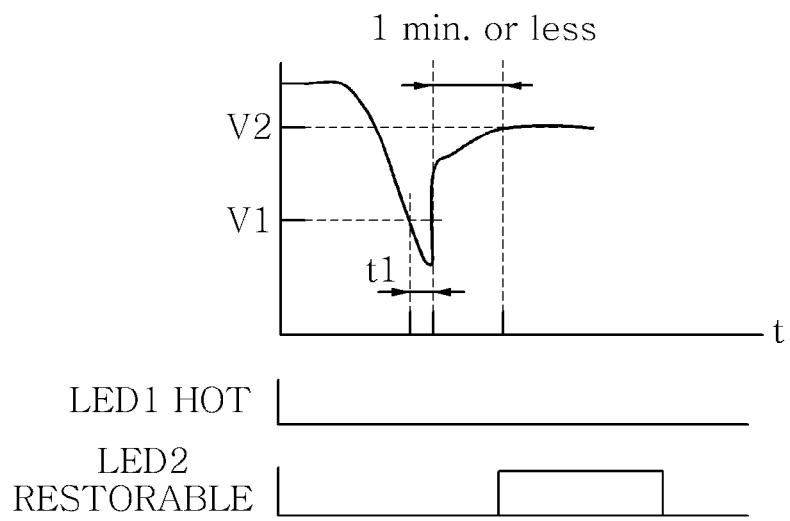
FIGS. 3A and 3B are time charts illustrating the operation of the battery pack.

A voltage obtained by dividing the voltage of the secondary battery B is supplied to and detected by the control unit 2 formed of a microcomputer. If the sum total voltage of the secondary battery B continues to be equal to or smaller than a predetermined value V1 for a specified time period t1 (e.g., one second), the control unit 2 interrupts a discharging path by converting the output to the transistor Tr3 to a low level and turning off the transistor Tr3 and the switching element FET (see FIG. 3A).

If the battery voltage is increased to another predetermined voltage V2 (V2>V1) within a time period of, e.g., one minute, after interruption of the discharging path, the control unit 2 determines the discharging operation to be restartable. In order to notify the user of the restorable state, the control unit 2 turns on the light-emitting diode LED2 of the notification unit 4 that indicates the restorability. At this time, if the user pushes down a switch SW serving as the operation unit 5 so that an output voltage from the operation unit 5 is switched from a first voltage to a second voltage, the control unit 2 connects the discharging path by converting the output to the transistor Tr3 to a high level and eventually turning the switch unit 1 on. The light-emitting diode LED2 is turned off at this time.

Figure 3B:
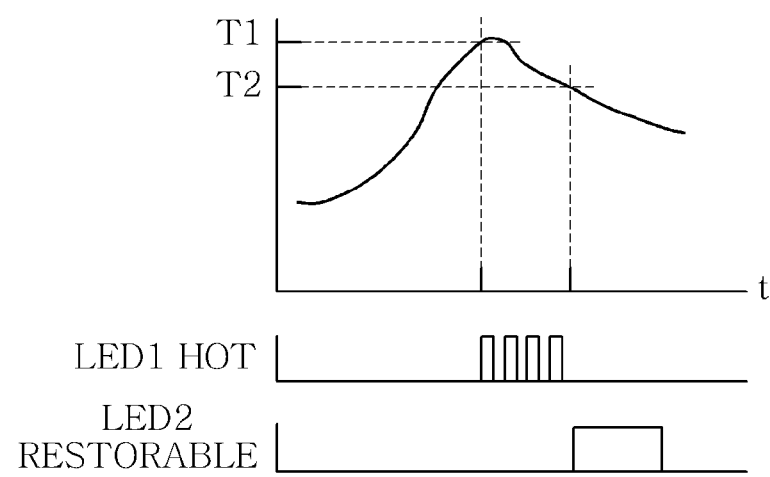

Further, during the discharging operation, the temperature detection in the status detection unit 3 is conducted by using the divided voltage between a thermistor and a resistor of the temperature detection unit 32. The voltage corresponding to the temperature is inputted to the control unit 2. If the voltage reaches a value corresponding to a predetermined temperature T1, the control unit 2 interrupts the discharging path by turning off the transistor Tr3 and opening the switch unit 1 as mentioned earlier. In order to notify the user that the discharging path was interrupted due to the temperature rise in the secondary battery B, the control unit 2 allows the light-emitting diode LED1 to blink at a time interval of, e.g., 1 Hz (see FIG. 3B).

If the temperature of the secondary battery B is decreased to, e.g., T2 (smaller than T1) or less after opening the switch unit 1 and stopping the discharging operation, the control unit 2 turns off the light-emitting diode LED1 and turns on the light-emitting diode LED2, thereby notifying the user of the availability to restart the discharging operation.

At this time, upon operating the operation unit 5 or upon receiving a signal indicative of the connection of the battery pack to a recharger from the input unit 6, the control unit 2 closes the switch unit 1 to connect the discharging path and turns off the light-emitting diode LED2.

The restoration through the operation of the operation unit 5 is available only after the control unit 2 has determined the discharging operation to be restartable. At the time when the discharging operation is not determined to be restartable, no restoration occurs even if the user operates the operation unit 5.

Figure 4:
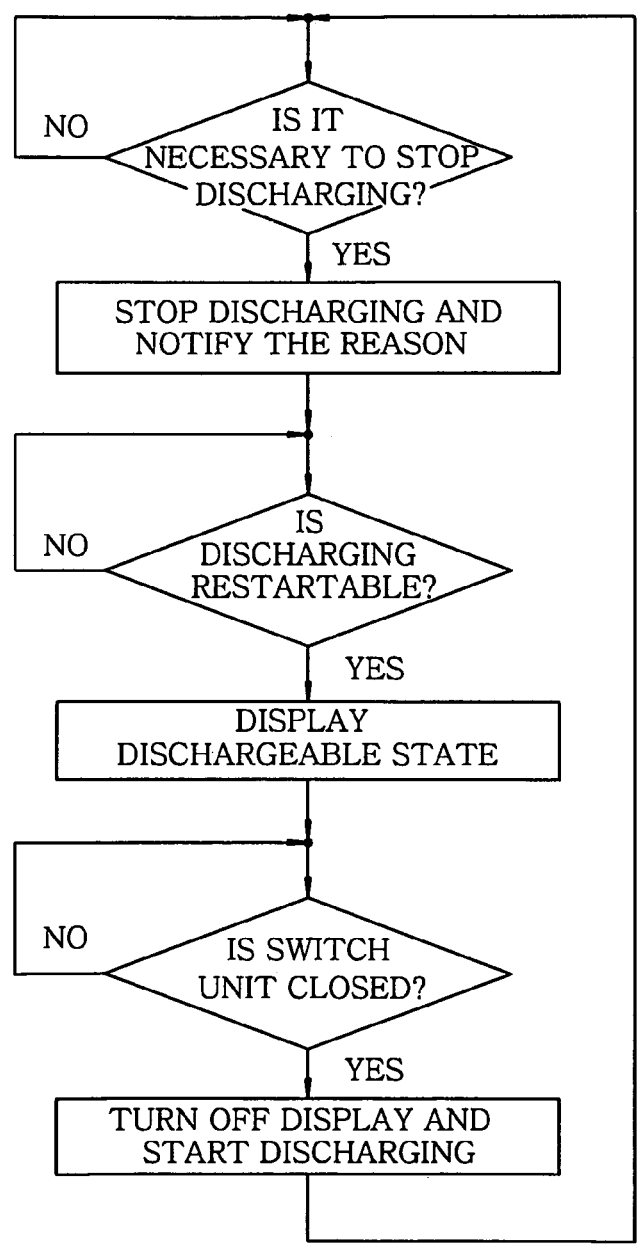
FIG. 4 is a flowchart illustrating the operation of the battery pack.

FIG. 4 is a flowchart illustrating the operation of the battery pack. If the battery pack comes into a dischargeable state, the notification unit 4 notifies the user of that state but the discharging operation is not restarted at once. The discharging operation is restarted at the time when the user operates the operation unit 5.

The restoration is effectuated by the connection of the battery pack to a recharger as well as by the operation of the operation unit 5. As set forth earlier, the input unit 6 is designed to monitor the voltage of the charging/discharging terminal Vc. The control unit 2 receives through the input unit 6 the voltage of the charging/discharging terminal Vc when the switch unit 1 is opened. If the voltage is not zero as a result of connection of the battery pack to a recharger, the control unit 2 determines that the battery pack has been connected to the recharger. When the discharging operation is determined to be restartable, the control unit 2 closes the switch unit 1 to connect the discharging path (also serving as the recharging path in this case) and turns off the light-emitting diode LED2.

Figure 5:
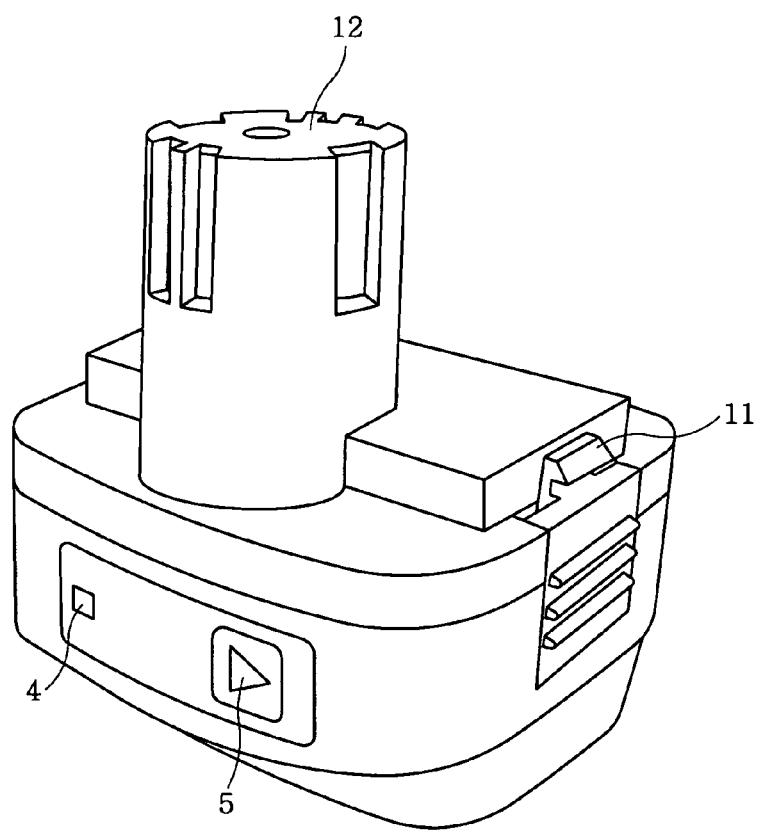
FIG. 5 is a perspective view showing the external appearance of the battery pack.

FIG. 5 shows one example of the external appearance of the battery pack. The battery pack illustrated is used for an electric power tool and includes the notification unit 4 and the operation unit 5. In FIG. 5, reference numeral "11" designates a hook used in mounting and removing the battery pack and reference numeral "12" designates a connector in which the common terminal C and the charging/discharging terminal Vc are arranged. The LED1 emitting, e.g., red light and the LED2 emitting, e.g., green light are arranged in the same place.

It should be noted that the operation unit 5 of the present embodiment is provided separately from a control switch, e.g., a trigger switch, of the electric power tool.

While the status detection unit 3 described above is of the type that can detect the over-discharging and the temperature rise, it may be of the type capable of detecting an over-current and other trouble.

While the invention has been shown and described with respect to the preferred embodiments, it will be understood by those skilled in the art that various changes and modification may be made without departing from the scope of the invention as defined in the following claims.

What is claimed is:

1. A battery pack comprising:
   a status detection unit for detecting a status of a battery;
   a switch unit for interrupting a discharging path of the battery;
   a notification unit for notifying a user of the status of the battery;
   an operation unit operable by the user; and
   a control unit for opening and closing the switch unit, the control unit being configured to have the switch unit perform interruption of the discharging path of the battery when the status of the battery detected by the status detection unit is an abnormal status
   wherein the status detection unit includes a voltage detection unit for detecting a voltage of the battery,
   wherein the control unit interrupts the discharging path without a notification of the notification unit when the voltage of the battery continues to be equal to or smaller than a first predetermined voltage for a first specified time period,
   wherein the control unit has the notification unit notify the user of an availability to restart a discharging operation and close the switch unit in response to an operation signal inputted from the operation unit to make the battery pack dischargeable when the voltage of the battery is increased to a second predetermined voltage within a second specified time period after the interruption of the discharging path,
   wherein the status detection unit includes a temperature detection unit for detecting the temperature of the battery,
   wherein the control unit interrupts the discharging path and has the notification unit notify the user of a temperature rise when the temperature of the battery detected is equal to or higher than a first predetermined temperature,
   wherein the control unit has the notification unit notify the user of the availability to restart the discharging operation and close the switch unit in response to the operation signal inputted from the operation unit to make the battery pack dischargeable when the temperature of the battery detected is decreased to a second predetermined temperature or less, and
   wherein the discharging operation is restarted in response to the operation signal input by the user from the operation unit.

2. The battery pack of claim 1, wherein the control unit includes an input unit for monitoring the connection of the battery pack to a recharger, and wherein the control unit receives a signal indicative of the connection of the battery pack to the recharger from the input unit and closes the switch unit to make the battery pack rechargeable when the discharging operation is determined to be restartable.

3. The battery pack of claim 1, wherein the notification unit comprises a light-emitting diode.

4. The battery pack of claim 3, wherein the control unit turns on the light-emitting diode when the status of the battery detected by the status detection unit is recovered from the abnormal status and the control unit turns off the light-emitting diode when the switch unit is closed.

5. The battery pack of claim 1, wherein the availability to restart the discharging operation is no longer notified after the discharging operation is restarted.

* * * * *